United States Patent
Cech et al.

(10) Patent No.: US 10,252,640 B2
(45) Date of Patent: Apr. 9, 2019

(54) SEATBELT AND CHILD SEAT ANCHOR BASED OCCUPANCY DETECTION SYSTEM

(71) Applicant: Joyson Safety Systems Acquisition LLC, Auburn Hills, MI (US)

(72) Inventors: Leonard Cech, Brighton, MI (US); Chakravarthi Mallikarjun Nagolu, Shelby Township, MI (US)

(73) Assignee: JOYSON SAFETY SYSTEMS ACQUISITION LLC, Auburn Hills, MI (US)

( * ) Notice: Subject to any disclaimer, the term of this patent is extended or adjusted under 35 U.S.C. 154(b) by 0 days.

(21) Appl. No.: 15/681,668

(22) Filed: Aug. 21, 2017

(65) Prior Publication Data

US 2019/0054841 A1 Feb. 21, 2019

(51) Int. Cl.
| | |
|---|---|
| *B60N 2/00* | (2006.01) |
| *G08B 21/22* | (2006.01) |
| *B60R 21/015* | (2006.01) |
| *B60N 2/28* | (2006.01) |

(52) U.S. Cl.
CPC ........... *B60N 2/002* (2013.01); *B60N 2/2806* (2013.01); *B60R 21/01544* (2014.10); *B60R 21/01556* (2014.10); *G08B 21/22* (2013.01); *B60N 2002/2815* (2013.01)

(58) Field of Classification Search
CPC .................. B60N 2/002; B60N 2/2806; B60N 2002/2815; B60R 21/01544; B60R 21/01556
USPC ....................................................... 340/573.1
See application file for complete search history.

(56) References Cited

U.S. PATENT DOCUMENTS

| | | |
|---|---|---|
| 6,104,293 A | 8/2000 | Rossi |
| 6,364,352 B1 | 4/2002 | Norton |
| 6,566,869 B2 | 5/2003 | Chamings et al. |
| 6,903,286 B2 | 6/2005 | Kaijala et al. |
| 6,922,147 B1 | 7/2005 | Viksnins et al. |
| 7,401,834 B2 | 7/2008 | Browne et al. |
| 7,410,214 B2 | 8/2008 | Hayden |
| 8,179,274 B2 | 5/2012 | Rork et al. |
| 8,258,932 B2 | 9/2012 | Wahlstrom |

(Continued)

FOREIGN PATENT DOCUMENTS

WO 2008063999 5/2008

OTHER PUBLICATIONS

International Search Report and Written Opinion, dated Nov. 3, 2017, issued in Application No. PCT/US2017/047831.

(Continued)

*Primary Examiner* — John A Tweel, Jr.
(74) *Attorney, Agent, or Firm* — Meunier Carlin & Curfman LLC

(57) ABSTRACT

The present invention is directed to apparatus for detecting a child left unattended in a car seat as well as the status of the connection between the car seat and the vehicle. The apparatus includes a sensor module and a processor. The sensor module including a sensor for measuring force data associated with the coupling between car seat and a vehicle. The processor receives and analyzes the sensor data to determine the status of the child/child seat, and then communicates status data to a caretaker. Counter-measure instructions can also be provided to the vehicle for altering the vehicle state/environment.

17 Claims, 12 Drawing Sheets

(56) References Cited

U.S. PATENT DOCUMENTS

| | | |
|---|---|---|
| 8,610,569 B2 | 12/2013 | Lanta |
| 9,266,535 B2 * | 2/2016 | Schoenberg ........... B60N 2/002 |
| 2008/0094195 A1 | 4/2008 | Odate et al. |
| 2008/0119989 A1 | 5/2008 | Henning et al. |
| 2008/0272633 A1 | 11/2008 | Hayden |
| 2009/0152933 A1 | 6/2009 | Casey |
| 2014/0253313 A1 | 9/2014 | Schoenberg |
| 2015/0130605 A1 | 5/2015 | Helm |
| 2015/0265200 A1 | 9/2015 | Mahdi |
| 2017/0236395 A1 | 8/2017 | Cech |

OTHER PUBLICATIONS

Rudd, R., Prasad, A., Weston, D., & Wietholter, K. (Jul. 2015). Functional assessment of unattended child reminder systems. (Report No. DOT HS 812 187). Washington, DC: National Highway Traffic Safety Administration, 76 pages.

International Search Report and Written Opinion dated May 11, 2017, issued in Application No. PCT/US2017/017506.

Office Action issued in co-pending U.S. Appl. No. 15/430,330, dated Jun. 26, 2017.

Office Action issued in co-pending U.S. Appl. No. 15/430,330, dated Dec. 28, 2017.

* cited by examiner

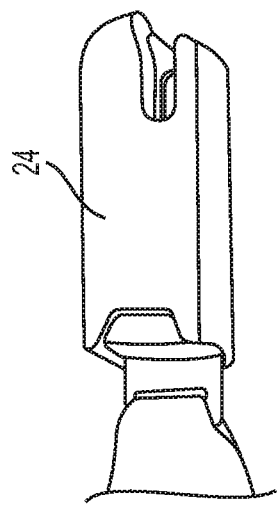
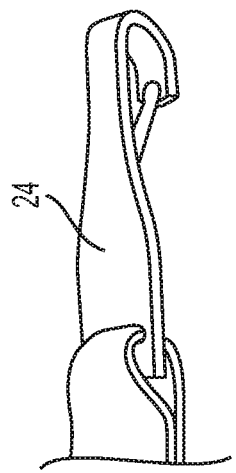

SEATBELT AND CHILD SEAT ANCHOR BASED OCCUPANCY DETECTION SYSTEM

FIELD

This invention relates generally to systems and methods for detecting a child left unattended in vehicle and notifying a caregiver.

BACKGROUND

Various systems and method have been utilized to address the problem of passengers, particularly children, being left unattended in a parked vehicle or gaining unauthorized access to a parked vehicle. Typically, these systems detect the presence of children and provide a warning/notifications. A number of commercially available systems include technology added to existing restraint systems. For example, a weight sensor can be added to a child seat. These systems can include a built-in transmitter for communicating with a key fob and/or other external device via bluetooth/smartphone. Other systems detect the presence of a child/passenger using 2D and 3D cameras, some systems use active electromagnetic methods such as ultrasonics and acoustics, and others include chest clip/buckle sensors/transmitters that detect when the clip/buckle is latched. While these systems have shown the potential to detect the presence of a child seat and classify it as occupied or un-occupied, they are prone to error. For example, clothing, lack of motion of the occupant, and user error can all result in faulty occupant detection. Accordingly, there is a need in the art for an occupant detection system integrated into the child seat operation that is both reliable and does not require a considerable level of effort from the caregiver for proper operation.

SUMMARY

The present disclosure is directed to an apparatus for detecting the status of a child restraint system, particularly the presence of a child within a child restraint system. The apparatus may include a sensor module and a corresponding processor. The sensor module may include a sensor for measuring sensor data associated with a coupling between an attachment portion of a child restraint system and a vehicle. The processor may be in electrical communication with the sensor module, and a memory, where the processor executes computer-readable instructions stored on the memory. The instructions may cause the processor to receive the sensor data, determine a status of the child restraint system based on the received sensor data, and communicate status data corresponding to the determined status of the child restraint system.

The sensor data may include data associated with a force, pressure, acceleration, and/or detection of a latching clip measured at the sensor. The sensor data may correspond to movement of the child restraint system. The sensor data may also include spatially distributed reaction force data associated with the movement of the child restraint system. The movement of the child restraint system may correspond to respiration and/or a heart rate of an occupant within the child restraint system.

Where the vehicle includes an anchor mounting member, the sensor module may be coupled to the attachment portion of the child restraint system and/or the anchor mounting member of the vehicle. The sensor module is located in the mechanical force path between the child restraint system and the anchor mounting member. The anchor mounting member of the vehicle may include a lower anchor point of a vehicle and/or a tether anchor point of a vehicle, such as those included in the LATCH system described below. The anchor mounting member of the vehicle may also include the seat belt of a vehicle. The apparatus may include a sleeve coupled to the anchor mounting member of the vehicle and the sleeve includes the sensor module.

The attachment portion of the child restraint system may also include an anchor assembly associated with the child restraint system for coupling a seat structure of the child restraint system to the anchor mounting member of the vehicle. The anchor assembly being coupled to the child restraint system at a coupling point and the sensor module may be located on the child restraint system adjacent the coupling point between the anchor assembly and the seat structure.

The sensor module may include a force/acceleration sensor that measures a tensional force and/or a motion between the child restraint system and the anchor mounting member. The sensor module may include a load cell that measures compressive force on the sensor module corresponding to tension between the child restraint system and the anchor mounting member. The sensor module may include a flexure sensor that measures the flexure of the sensor module resulting from tension between the child restraint system and the anchor mounting member. The sensor may include an accelerometer, a single-axis inertial sensor, a multiple-axis inertial sensor, and/or an orthogonal tri-axial inertial sensor.

The sensor data received at the processor may comprise a linear force component and/or a rotational force component associated with a force and/or an acceleration of the child restraint system relative to the vehicle.

The status of the child restraint system determined by the processor may comprise a status of the connection between the vehicle and the child restraint system. The status of the child restraint system may comprise a status of an occupant of the child restraint system, where the status of the occupant may include the presence of the occupant of the child restraint system and/or physiological data of the occupant of the child restraint system. The physiological data may comprise a weight of the occupant, movement of the occupant, respiratory rate of the occupant, heart rate of the occupant, audible effect of the occupant, and/or emotional state of the occupant.

The status of the connection between the vehicle and the child restraint system may include an improper connection between the vehicle and the child restraint system that may be determined based on the sensor data associated with a force above a minimum threshold for an attachment point between the child restraint system and the vehicle and/or a force below the minimum threshold for the attachment point between the child restraint system and the vehicle. The status of the connection indicating an improper connection between the vehicle and the child restraint system may be determined in response to not receiving any sensor data.

The instructions executed by the processor may cause the processor to isolate sensor data associated with movement of the occupant in the child restraint system from three-dimensional motion data associated with movement of the vehicle. The instructions may cause the processor to isolate the sensor data associated with movement of the occupant using a principal component analysis procedure. The instructions may cause the processor to continuously receive sensor data from the sensor module.

The instructions executed by the processor may cause the processor to receive vehicle data from the vehicle, where the analysis and/or receipt of the vehicle data triggers the processor to receive sensor data from the sensor module. The vehicle data may include operational status data, ignition status data, gear state data, rigid body vibration data, vehicle motion data, HVAC control data, temperature data, door state data, window state data, and/or current estimated occupancy state data.

The status data communicated by the processor may include counter-measure instructions to alter a state of the vehicle. The counter-measure instruction may include instructions to initiate an audible alarm, provide a visual display to a vehicle occupant, and/or modify the vehicle environment. An audio and/or digital message may be sent via a telephonic or electronic messaging network, where the audio and/or digital message corresponds to the status data of the child restraint system.

In another aspect, the present disclosure is directed to a method of detecting and determining a status if a child restraint system. The method may include collecting, at sensor module sensor data corresponding to a force and/or an acceleration measured at a coupling point between the child restraint system and an anchor mounting member fixedly coupled to a vehicle. The sensor data may be indicative of movement of an occupant of the child restraint system. The sensor data may be received at a processor and the status of the child restraint system determined. Status data corresponding to the status of the child restraint system may be generated and communicated to a control unit. The status data may comprise a counter-measure instruction based on the status of the child restraint system. The status data may be communicated to a messaging system external from the vehicle. An audio and/or digital message via a telephonic and/or electronic messaging network corresponding to the status data may be communicated external to the vehicle.

The details of one or more embodiments of the invention are set forth in the accompanying drawings and the description below. Other features, objects, and advantages of the invention will be apparent from the description and drawings, and from the claims.

DESCRIPTION OF THE DRAWINGS

The device is explained in even greater detail in the following drawings. The drawings are merely examples to illustrate the structure of preferred devices and certain features that may be used singularly or in combination with other features. The invention should not be limited to the examples shown. In the drawings, like reference numbers and designations in the various drawings indicate like elements.

FIG. 4A is an example hook-type connector for a child restraint seat;

FIG. 4B is an example buckle-type connector for a child restraint seat;

Certain examples of the invention will now be described with reference to the drawings. In general, such embodiments relate to a system used with a child restraint seat to detect a child left unattended in vehicle and to notify a caregiver.

DETAILED DESCRIPTION

Figure 1:
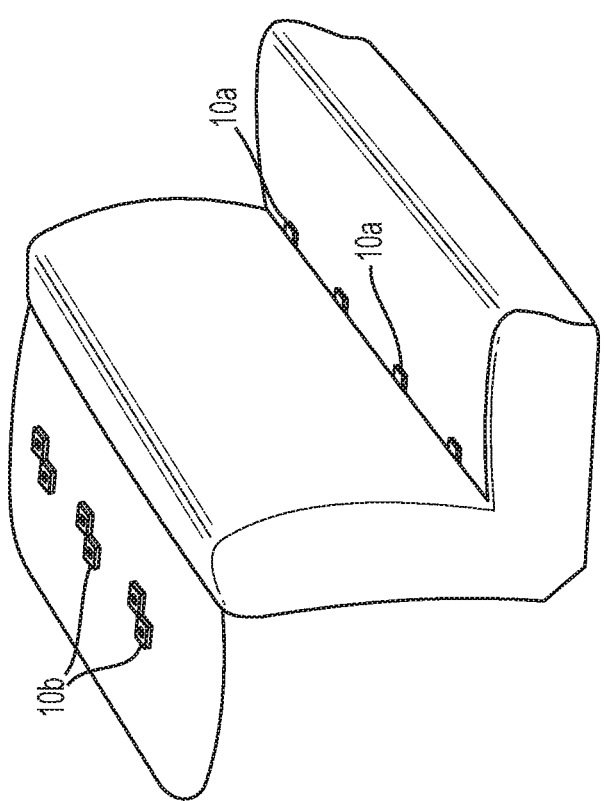
FIG. 1 is a schematic representation of ISOFIX anchor points a passenger vehicle.
Figure 2:
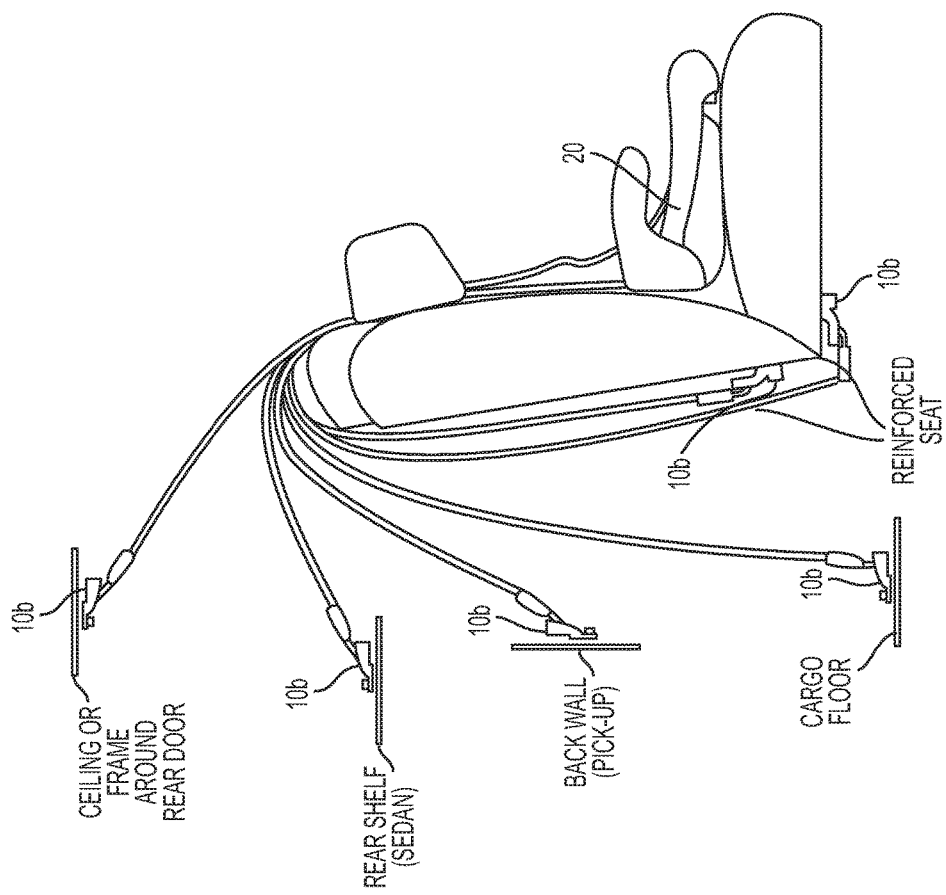
FIG. 2 is a schematic representation of ISOFIX anchor points in a passenger vehicle.

The International Standards Organization (ISO) and National Highway Traffic Safety Administration (NHTSA) provide standards for universal child restraint anchorage systems. The ISO developed ISOFIX (ISO 1999a, 13216) as the international standard for attachment points for child seats in passenger cars. Referred to as LATCH ("Lower Anchors and Tethers for Children") in the US and UAS ("Universal Anchorage System") in Canada, ISOFIX provides guidelines for standard attachment points that can be used as an alternative to securing a child seat with a seat belt. ISOFIX requires two lower attachment points and a means to "limit pitch rotation of the child restraint." Typically, these systems include two lower anchorage points located at the vehicle seat bight (intersection between the bottom vehicle seat cushion and the back cushion) and a top tether strap used in conjunction with forward-facing car seats. The tether can attach to anchor points located on the rear shelf, seat back, floor, cargo area, or ceiling of the vehicle. FIGS. 1 and 2 illustrate the locations of the lower anchor member 10a and the tether anchor member 10b in an example passenger vehicle (FIG. 2 illustrating various optional locations for the tether anchor member 10b). The anchor members 10 are fixed to the vehicle such that coupling the child seat 20 to the anchor/tether points provides for a secure connection between the child restraint system (car seat) 20 and the car body.

Figure 3:
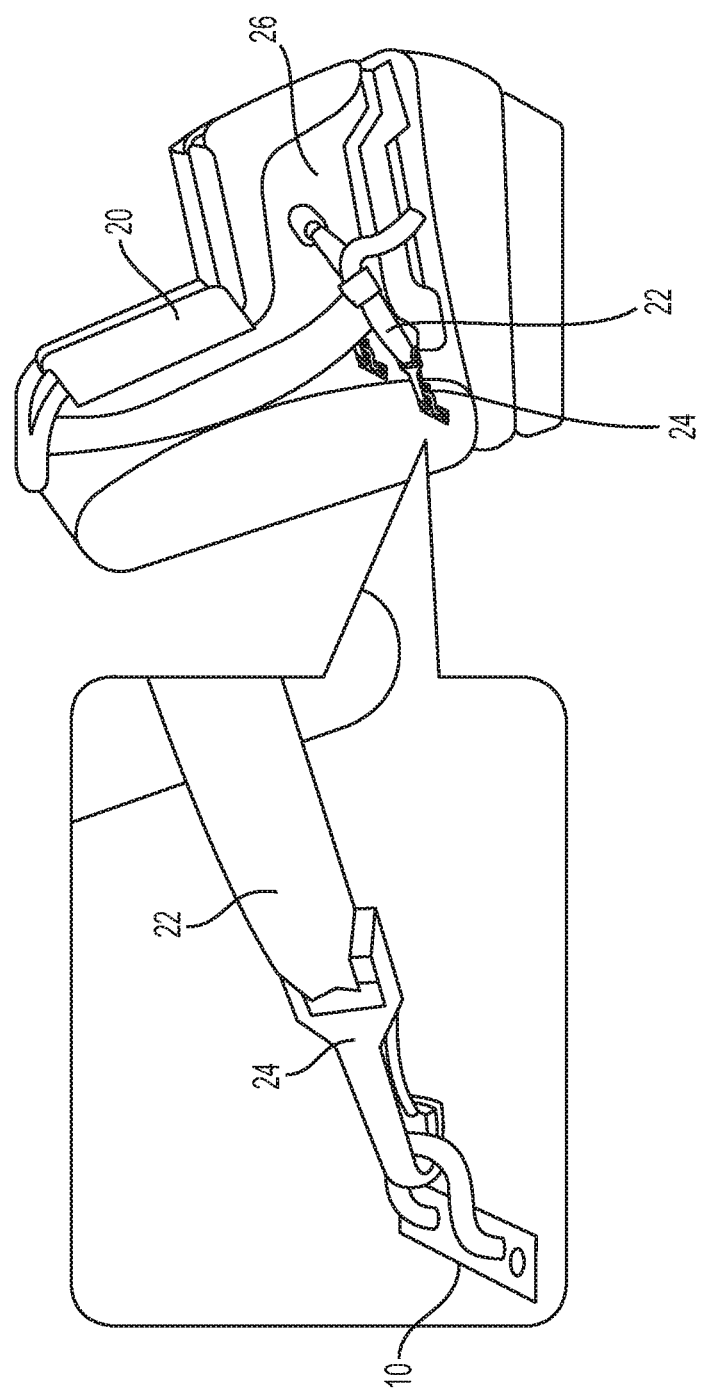
FIG. 3 is a schematic representation of an example ISOFIX anchor point and child restraint system.

Most child restraint systems 20 are equipped with an ISOFIX components/anchor assembly including a fabric strap 22 and clip/buckle 24 attached to the seat structure 26 of the child seat 20. As illustrated in FIG. 3, the child seat 20 can include clip/buckle 24 for attachment to the vehicle anchor/tether mounting members 10 to secure the seat structure 26 to the vehicle. FIGS. 1-3 illustrate an attachment portion/clip 24 coupled to the tether mounting member 10b of the vehicle and/or an attachment portion/clip 24 coupled to the anchor mounting member 10a of the vehicle. Example attachment portions/clips 24 can consist of a hook-type clip illustrated in FIGS. 3 and 4A or a buckle-type clip illustrated in FIG. 4B, or any other clip known in the art for use with an ISOFIX attachment. Regardless of the style, these connectors provide a secure and removable connection between the child restraint and the anchor/tether mounting member 10 of the vehicle.

As will be described herein, a sensor module 30 can be included on the vehicle ISOFIX anchor/tether mounting member(s) 10 and/or the child seat attachment portion/clip 24. The sensor module 30 can be used to detect an occupant of the child restraint 20, determining certain information about the seat and/or occupant, and communicating an output signal to the vehicle and/or some external device, e.g., a messaging system. In particular, the sensor module 30 can be used to detect the presence of a child left unattended in a vehicle, and provide a message to a caregiver and/or alter the vehicle operation (e.g., turn on the air conditioning).

Figure 5:
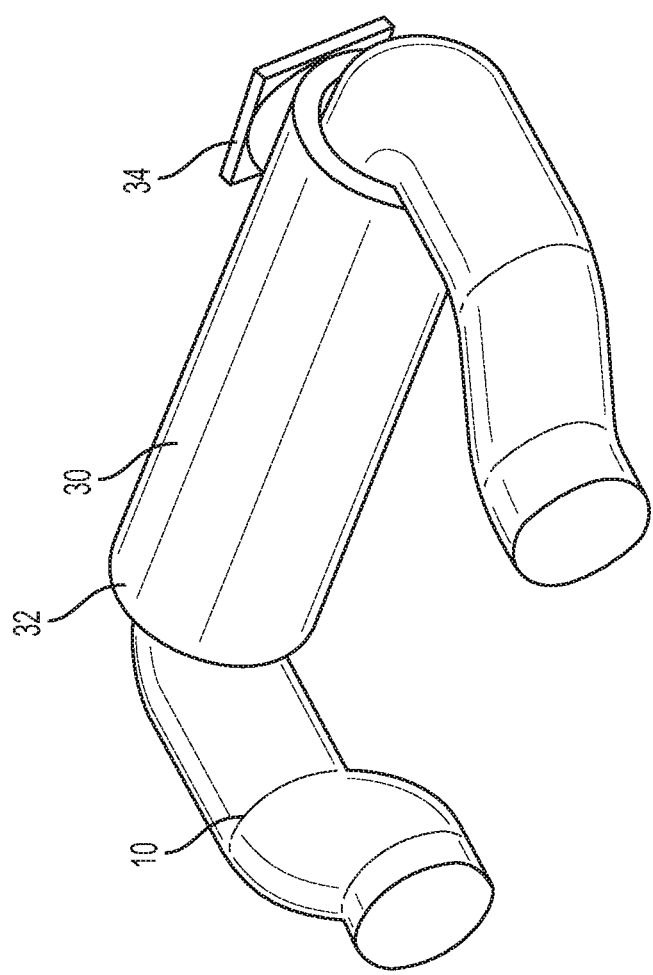
FIG. 5 provides a schematic representation of a sensor module included on the ISOFIX anchor/tether mounting member of a vehicle.
Figure 6:
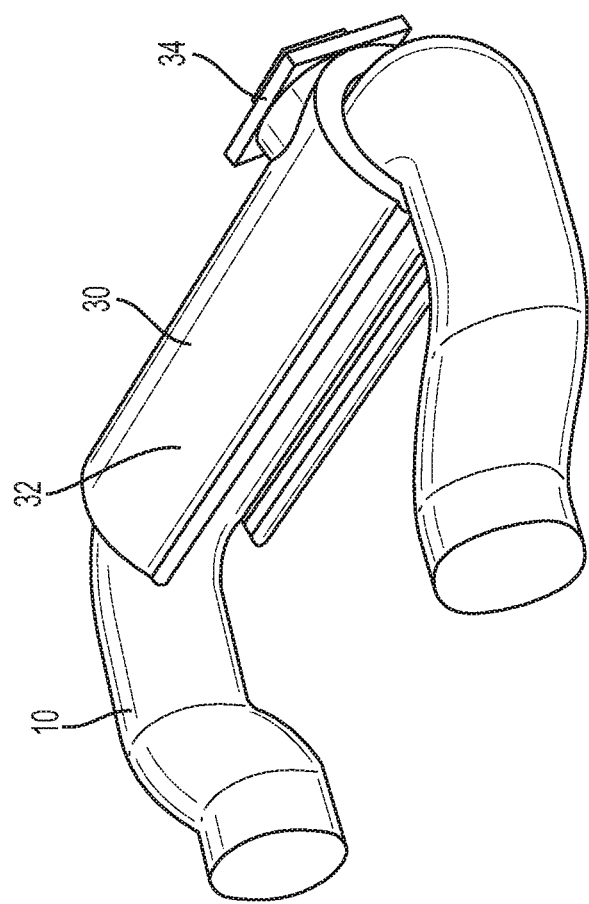
FIG. 6 provides a schematic representation of a sensor module included on the ISOFIX anchor/tether mounting member of a vehicle.
Figure 7A:
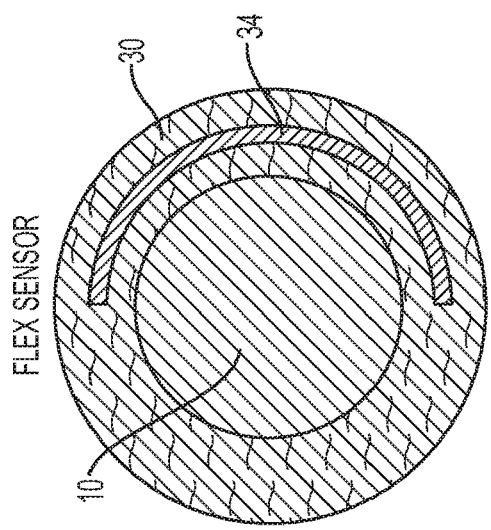
FIG. 7A provides a schematic representation of a cross-section of a flex sensor of a sensor module.
Figure 7B:
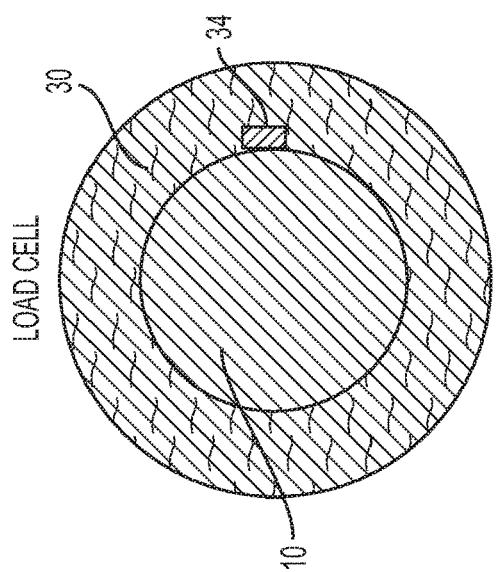
FIG. 7B provides a schematic representations of a cross-section of a load cell sensor of a sensor module.

FIG. 5 provides a schematic representation of an example sensor module 30 that can be included on the ISOFIX anchor/tether mounting member 10 of a vehicle. The sensor module 30 can be used to measure sensor data associated with the coupling between the vehicle at the ISOFIX anchor/tether mounting member 10 and the attachment portion/clip 24 of the child restraint system 20 (e.g., the clip or buckle associated with the child seat such as those illustrated in FIGS. 4A and 4B). The sensor module 30 can comprise a permanent or semi-permanent or removable sleeve 32 provided on the ISOFIX anchor/tether mounting member 10, such as the sleeve 32 construction illustrated in FIG. 5. The sensor module 30 can also comprise a removable sleeve 32 provided on the ISOFIX anchor/tether mounting member 10. An example removable, such as the snap-on-type sleeve 32 is illustrated in FIG. 6. The sensor module 30 is in electrical communication with the processor 40 and/or vehicle control unit via a wired and/or wireless connection. As illustrated in FIGS. 5 and 6, the sensor module 30 can include a single sensor 34 positioned on the sleeve 32. It is contemplated that the sensor module 30 can include multiple sensors 34 positioned along and around the sleeve 32. FIGS. 7A and 7B provide cross-sectional views of example flex and load cell sensors 34 provided on a sleeve-type sensor module 30 mounted on an anchor/tether mounting member 10. FIG. 7A illustrates a flex sensor 34 provided within the sleeve 32. It is also contemplated that the flex sensor 34 can be positioned on a surface of the sleeve 32, such as the outer surface or the inner surface adjacent the mounting member 10. As provided in FIG. 7A, the flex sensor 34 can extend in a direction around a portion of the perimeter of the mounting member 10. The flex sensor 34 can also extend in a direction around the entire perimeter of the mounting member 10. FIG. 7B illustrates a load cell sensor 34 positioned within the sleeve 32. Similar to the flex sensor 34 of FIG. 7A, the load cell sensor 34 of FIG. 7B can be positioned within the sleeve 32 between the outer and inner surface, on/adjacent the outer surface of the sleeve 32, on/adjacent the inner surface of the sleeve 32 adjacent the mounting member 10.

In another example (not shown), the sensor module 32 can be provided on the attachment portion/clip 24 of the child restraint system 20. For example, the sensor module 30 can be included in the clip/buckle structure that is mated with the anchor/tether mounting member 10. In another example, the sensor module 30 can be included in the portion of the anchor assembly not associated with the clip/buckle structure. That is, the sensor module 30 could be included in the seat structure 26, the strap 22 that couples the clip/buckle 24 to the seat structure 26, and/or the coupling point between the seat structure 26 and the anchor assembly (e.g., the coupling point between the strap 22 and the seat structure 26). It is also contemplated that the sensor module 30 can be provided on a seat belt of the vehicle.

Whether positioned on the anchor mounting member 10 of the vehicle, the attachment portion/clip 24 of the child restraint system 20, and/or a vehicle seatbelt, the sensor module 30 is located in the mechanical force path between the child restraint system 20 and the vehicle/anchor mounting member 10.

The sensor module 30 can include a sensor 34 for measuring the sensor data associated with the coupling between an attachment portion/clip 24 of a child restraint system 20 and the anchor/tether mounting member 10 of the vehicle. The sensor 34 can include various types of force and flex sensors. For example, the sensor 34 can include a force/acceleration sensor that measures the tensional force, acceleration and/or relative motion between the child restraint system 20 and the anchor/tether mounting member 10. Force/acceleration sensors can include a multi-axis sensor, such as a one, two, or three-axis sensor. The accelerometer can include a single axis inertial sensor, a multi-axis inertial sensor, and/or an orthogonal tri-axial inertial sensor. The sensor 34 can include a load cell (resistive, capacitive, MEMS) for measuring the tension and compressive force on the sensor module 30 corresponding to the tension and compression between the child restraint system and the anchor/tether mounting member 10. The sensor module 30 can include a flexure sensor that measures the flexure of the sensor module 30 resulting from tension/compression between the child restraint system 20 and the anchor/tether mounting member 10. For example, the sensor 34 can include a piezoelectric/piezo-resistive sensor for measuring changes in the pressure, acceleration, strain between the child restraint system 20 and the anchor/tether mounting member 10. The sensor 34 can also include a temperature sensor for measuring the temperature within the vehicle and/or proximate the anchor/tether mounting members 10. It is contemplated that the sensor module 30 can include various numbers and types of sensors. For example, the sensor module 30 can include a single or multiple force/flex sensors. In another example, the sensor module 30 can include any combination of a force sensor with another force sensor, a load cell, an acceleration sensor, a flexure sensor, piezoelectric sensor and/or temperature sensor. FIGS. 7A and 7B provide cross-sectional views of example flex and load cell sensors 34 provided on a sensor module 30.

Figure 8:
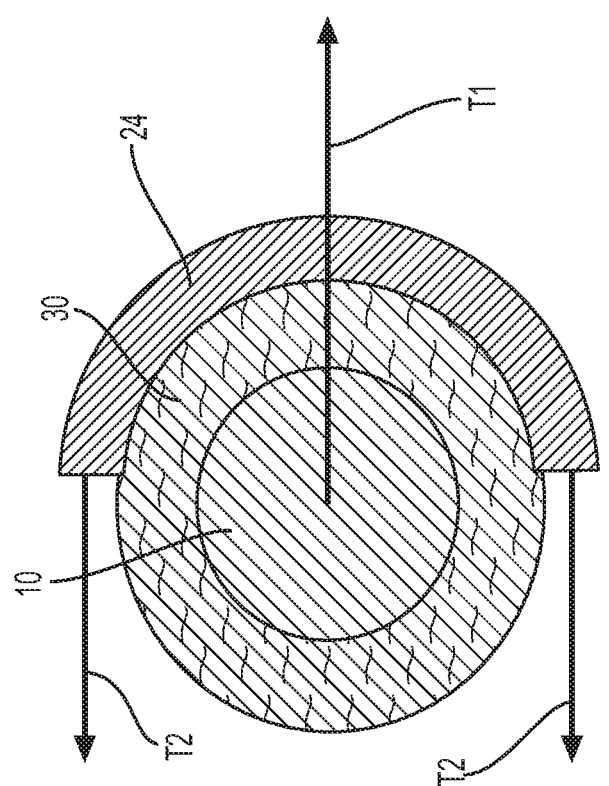
FIG. 8 provides a schematic representation of the relative tension forces measure at the sensor module.

FIG. 8 provides a schematic representation of the relative tension forces measure at the sensor module 30. Tension force (T1) is representative of the relative force of the anchor/tether mounting member 10 and/or the vehicle. Tension force T2 is representative of the relative force of the child restraint system 20 (including any occupants). The sensor data can include a linear force component and/or a rotational force component associated with the force and/or acceleration of the child restraint system 20 relative to the vehicle.

Generally, the sensor data measured by the sensor 34 is representative of force, pressure, and/or acceleration measurements between the child restraint system 20 and the anchor/tether mounting member 10 of the vehicle. The sensor data can also be representative of the presence or coupling of the attachment portion/clip 24 with the anchor/tether mounting member 10 (e.g., detect latching of the attachment portion/clip 24 to the anchor/tether mounting member 10 of the vehicle).

Based on the measured force, pressure and/or acceleration data, the sensor 34 can measure and provide data corresponding to movement of the child restraint system 20 with respect to the vehicle. For example, the movement of the child restraint system 20 can include the presence of an occupant of the child restraint system 20, and the movement of a child within the child restraint system 20 including general movement of the child's body and limbs, respiration, and heart rate. The sensor 34 can measure sensor data including spatially distributed reaction force data associated with the movement of the child/child restraint system 20.

That is, movement of a child within a restraint system 20 is not measured as a point force, but rather because the child's movement within the seat (including the minor movement associated with breathing) will induce non-uniform acceleration forces on the seat, resulting in a distributed reaction force measured at the sensors 24. Accordingly, multiple sensors 24 will have different force measurements at different locations. These measurements can be correlated into spatially distributed data. If a system were provided with only one sensor it could be very difficult to isolate the force data associated with movement within the child restraint system 20 versus force data external to the restraint (e.g., force data associated with movement of the vehicle). Because the external forces act on the (rigid) body of the vehicle, it is necessary to normalize the sensor data measured at the sensor module 30. The sensor data corresponding to movement of the child restraint/child can be isolated by subtracted out of the sensor data associated with the vehicle (received from a vehicle-based measuring unit, e.g., vehicle accelerometer, crash ECU, etc.) from the data measured at the sensor 34.

The system can include a processor 40 in electrical communication with the sensor 34/sensor module 30, a memory 42, and a vehicle control unit 50. The processor 40 can be used to control the operation of the sensor module 30, provide instruction for querying and directing operation of the vehicle, and send warning and operations signals to external devices/recipients using a communication system.

The sensor data can be analyzed by the processor 40. For example, the processor 40 may identify amplitude and phase differences between the different signals data (i.e., channels). These differences may be used for machine learning to classify patterns of human motion (e.g. breathing, crying, talking, moving, etc.). The number of nodes, sensitivity of the acceleration sensors 34 may by adjusted or chosen in order to allow for detection of respiration for the most challenging condition(s) (such as, for example, "due care" conditions, detection of newborn sleeping, one or more anchor points loosened, etc.). In order to provide useful functionality in certain situations, such as, a situation in which it is likely that a child has been left behind, the processor 40 may be configured to include an algorithm which can detect relatively small patterns (e.g., sinusoidal patterns) associated with respiration, indicating the seat is occupied. Any detection/classification algorithm(s) would be temporal function(s) of the nodal accelerometer signals such as example signals S1, S2, and S3 represented in FIGS. 9 and 10.

Figure 9:
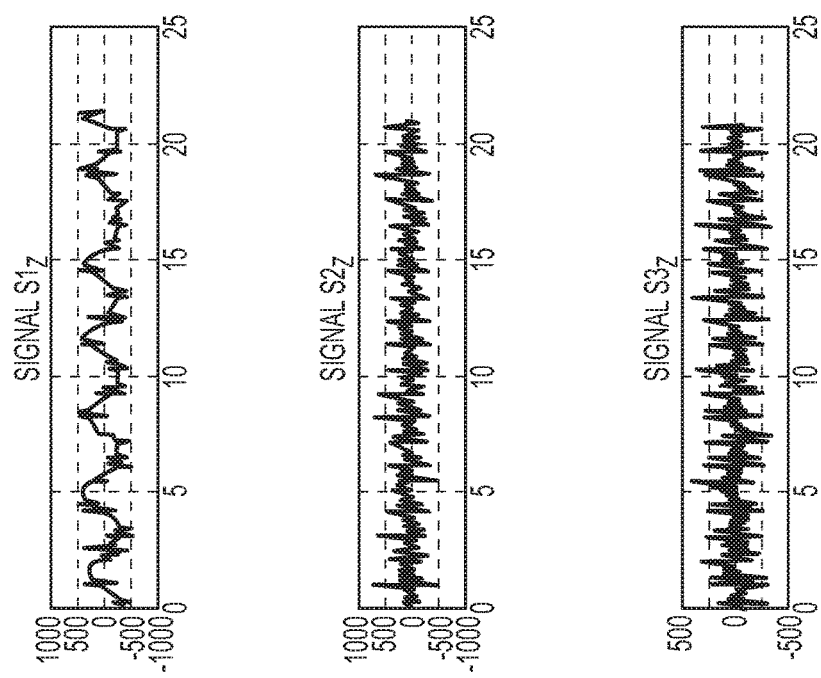
FIG. 9 provides example raw inertial sensor seatbelt and nodal signal data (Z-dimension only)
Figure 10:
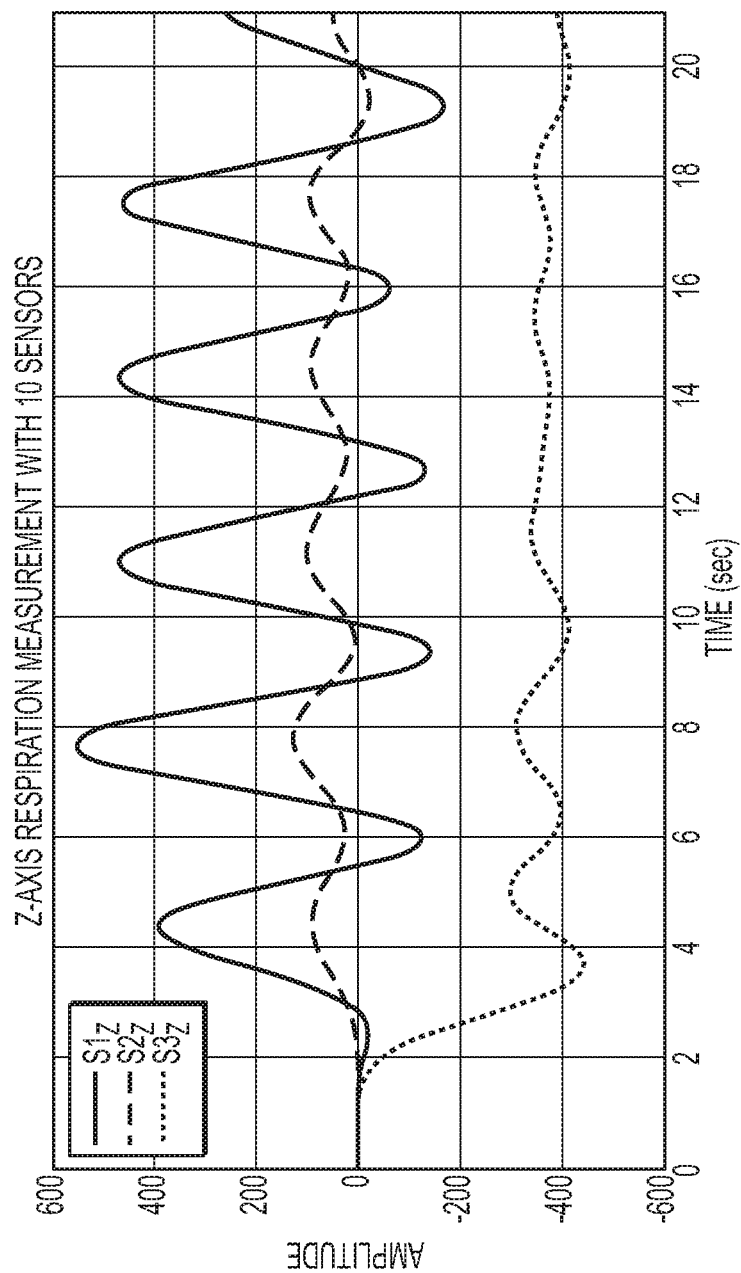
FIG. 10 provides example filtered signal data of FIG. 9.
Figure 11:
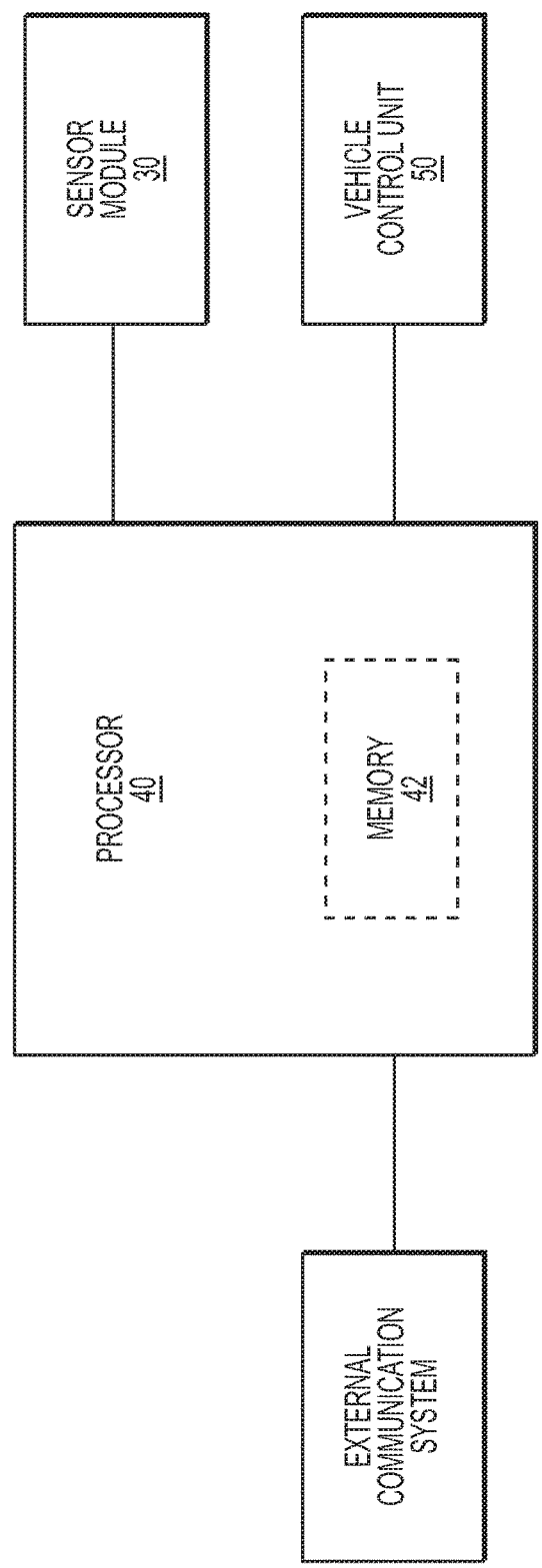
FIG. 11 provides a block diagram of sensor module.
Figure 12:
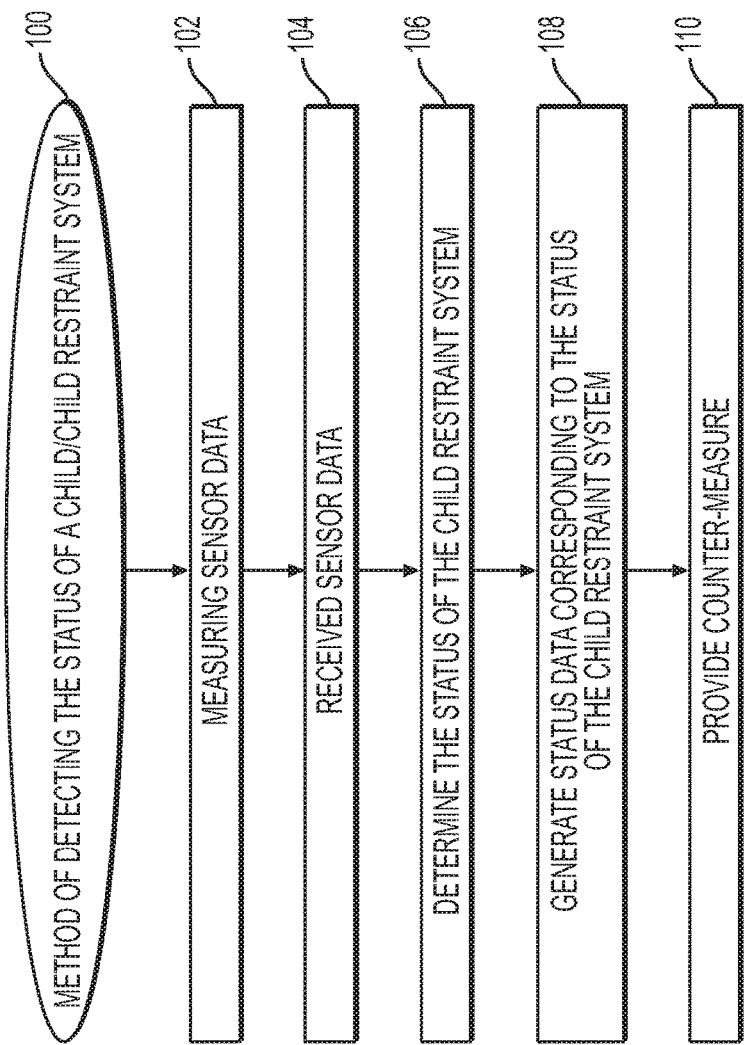
FIG. 12 provides a method of detecting the status of a child restraint system.

FIGS. 9 and 10 illustrate example signal data taken from a system including three sensors 34/sensor modules 30. Raw signal data is illustrated in FIG. 9 and is representative of the sensor data measured at each of three sensors (sensor S1, S2, and S3). As outlined above, the sensor can be used to measure signal data corresponding to both respiration and heart rate of the car seat occupant. For example, with respect to signal S1 illustrated in FIG. 9, the large oscillations of the data curve represent sensor data corresponding to the occupant's breath and the smaller spikes in the data curve are representative of the occupant's heartbeat. Accordingly, the graph of signal S1 indicates that for a single respiration cycle (inhale, exhale), three to four smaller spikes in sensor measurements along the data curve representative of the occupant's heartbeat.

The raw signal data can be filtered by applying standard real time digital/analog signal processing techniques, such as filtering and correlation, to further accentuate and isolate the target signals. FIG. 10 illustrates the filtered/processed raw signals for each of the three sensors 34/sensor modules 30. Also, as expected, the phase and amplitude of signal levels is a function of the placement of the sensors 34 and the physical respiration mechanical function of the occupant's body (e.g. sensor S1 and S2 clearly indicate motion of the diaphragm, indicating respiration cycles of inhale/exhale; while sensor S3 shows patterns indicating heart rate).

Additional algorithms and signal analytical techniques may be utilized in order to provide enhanced assessment of the state of a child located in the child seat. For example, weight, stature, activities (e.g. laughing, crying, physiological actions, health) and a basis for safety, comfort and convenience actuations based on a given state.

Upon receipt of sensor data from the sensor module 30, the processor 40 can isolate the sensor data (e.g., force, pressure, acceleration) corresponding to the child restraint system 20 from the force data associated with vehicle movement. That is, the memory 42 can store instructions for causing the processor 40 to isolate the measured sensor data associated with the movement of the child/child restraint system 20 from the three-dimensional motion/force data associated with movement of the vehicle (received from a vehicle-based measuring unit, e.g., vehicle accelerometer, crash ECU, etc.). In one example, three-dimensional sensor/motion data associated with vehicle motion measured at a vehicle-based measuring unit is compared (e.g., subtracted from) the three-dimensional sensor/motion data measured at the sensor module 30. In another example, by using two or more sensors (preferably three or more) the processor 40 can isolate the sensor data associated with the movement of the occupant in the child restraint system 20 using a principal component analysis procedure or other similar state detection and classification algorithms can isolate motion within the child restraint 20 from three-dimensional motion experienced by the entire vehicle (e.g. rigid body vibration due to wind or road noise).

In an example system, the memory 42 can store instructions for controlling the processor 40, the instructions causing the processor 40 to control the sensor module 30 operation. The processor 40 can request and receive sensor data from the sensor module 30. In an example system, the memory 42 can store instructions for causing the processor 40 to continuously receive sensor data from the sensor module 30. As a result, regardless of whether the vehicle is on or off, in motion or stationary, the sensor module 30 can continuously measure and send sensor data to the processor 40 as long as the child restraint system is coupled to the anchor/tether mounting members 10 of the vehicle. In a continuous update system, it is contemplated that the update rate of the sensor module 30 can be adjusted in response to analyzed sensor data. For example, update rate of the sensor module 30 can be increased or decreased in response to detected movement in the child restraint. In another example, the update rate of the sensor module 30 can be increased/decreased in response to a detected change in movement frequency. For example, if movement of the child suddenly increases or decreases the sensor module 30 may have a corresponding increase or decrease in its update rate, and vice-a-versa. In an example system, sensor module 30 may operate at sample rate of 1 measurement per second. The sample rate of the sensor can be increased to 240 measurements per second or even as high as 1,000 measurements per second, depending on customer needs and what data the sensor is measure. That is, a sensor designated/positioned to measure heart rate or respiration may generally operate at sample rate higher than a sensor designated/ positioned to movement or weight. In another example, the processor 40 can periodically request and receive sensor data from the sensor module 30. For example, upon receipt and/or analysis of sensor data at a certain threshold from the sensor module 30, the processor 40 can request and receive additional sensor data. In one example, if the processor 40 determines that the received sensor data is above or below a certain threshold, the processor 40 can request and receive additional sensor data. In another example, if the processor 40 determines certain trends in the sensor data, the processor can request and receive additional sensor data. For example, if the vehicle is traveling over rough terrain or the child is vigorously moving in the seat, the received sensor data would indicate a sudden and significant increase in movement of either the occupant or the vehicle. In response, the processor 40 can request/receive additional sensor data to determine if the sudden change in movement corresponds to the child or the vehicle and if any countermeasure or warning is required.

In another example, upon receipt and/or analysis of vehicle data from the vehicle's control unit, the processor 40 can direct the sensor module 30 and request and receive additional sensor data and/or increase the frequency of sensor 34 operation. Exemplary vehicle data that can trigger a request for sensor data includes: operational status data (i.e., whether the vehicle is on or off), ignition status data (e.g., attempted ignition), gear state data (e.g., what gear the transmission is operating in), rigid body vibration data, vehicle motion data (e.g., whether the vehicle is moving or stationary, whether the vehicle has experience a sudden acceleration/deceleration), HVAC control data, temperature data (e.g., the internal temperature of the vehicle exceeding a maximum threshold), door state data (e.g., whether a door is open or closed), window state data (e.g., whether a window is open or closed), current estimated occupancy state data, whether the vehicle has experienced a catastrophic failure and/or sudden impact, and whether the occupant has indicated an emergency situation (e.g., by turning on hazard lights, requesting emergency assistance).

For example, if the processor 40 determines that the vehicle data indicates a sudden acceleration/deceleration by comparing current sensor data with historical sensor data, the processor 40 may trigger sensor module 30 operation. In another example, if the processor 40 determines that the vehicle data indicates a change in the estimated occupancy state (e.g., a change in the number of passengers, lack of a driver, etc.), the processor 40 may trigger sensor module 30 operation. In another example, if the processor 40 determines that the vehicle data indicate that the vehicle has experienced a catastrophic failure and/or sudden impact or that an occupant has indicated an emergency situation, the processor 40 may trigger sensor module 30 operation.

It is also contemplated that upon receipt and/or analysis of certain combinations of vehicle data, the processor 40 can direct sensor module 30 operation. For example, the processor 40 can identify vehicle data indicating a vehicle door is open in combination with vehicle data indicating the vehicle is operational/in motion (e.g., operational status, ignition status, gear state, vibration data, and/or motion data), the processor 40 may trigger sensor module 30 operation.

In addition to identifying when a child is left unattended in a vehicle, the present system may also be used to determine that the child is properly seated and restrained in the child restraint system, and that the child restraint system 20 is properly installed within the vehicle. In an example system, the memory 42 can store instructions for causing the processor 40 to analyze the sensor data and determine a "status" of the child restraint system 20. The status of the child restraint system 20 includes the status of the connection between the vehicle and the child restraint system 20. For example, the status of the connection can include the connection of the attachment portion/clip 24 at the anchor/tether mounting member 10, i.e., whether the attachment portion/clip 24 is locked or unlocked on the mounting member 10. The status of the connection can also include the connection of the vehicle seat belt, i.e., whether the buckle of the vehicle seat belt is locked or unlocked. The status of the connection can indicate an "improper connection" or "failed connection" between the vehicle and the child restraint system 20. An "improper connection" can be determined based on the receipt of sensor data indicating that the clip/latch/buckle is not properly closed and locked. For example, when the clip/latch/buckle is properly attached to the vehicle, sensors 34 positioned at each clip/connection point should measure similar sensor data. That is, when the clip is properly attached to the vehicle, the sensors 34 at each connection point should have the same, or substantially the same, measurements. Measured sensor data that is unequal, outside of a standard deviation, would indicate an improper or failed connection of the child restraint with the vehicle. An "improper connection" can also be determined based on the comparison the received sensor data with stored force data/force profile data indicating a minimum threshold force between the child restraint system 20 and the vehicle (i.e., stored data indicating a locked, proper connection). An "improper connection" is determined when the received sensor data indicates a measured force below the minimum threshold for the attachment point between the child restraint system 20 and the vehicle. For example, sensor data below the threshold would indicate inadequate tension on the strap 22 signaling that the child restraint system 20 is not properly secured to the anchor mounting member 10 and that the strap 22 should be tightened.

The status of the connection can also include identifying the quality of the connection, for example, identifying a "good connection" and/or a "poor connection" or "connection error" between the child restraint system and the vehicle. A "poor connection" is determined based comparing received sensor data with a range of stored force data/force profile data, the range including the minimum threshold force (i.e., a proper connection) as the lower limit of the range. A "good connection" is determined based on comparing the received sensor data with a range of stored force data/force profile data, the upper limit of the "poor connection" range being the lower limit of the "good connection" range. That is, a "poor connection" corresponds to a force measurement in the range of forces measured at, and immediately above, the minimum threshold for a secure connection. A "good connection" corresponds to a force measurement in a range greater than the poor connection range. For example, a proper connection may be indicated at a force measurement of 1x (where x represents the minimum threshold force for connection at the attachment point). A "poor connection" may be determined when the received sensor data indicates the force measures anywhere in the range of 1x-10x. A "good connection" may be determined when the received sensor data indicates the force measures anywhere in the range of 10x-20x. It is also contemplated that a "failed connection" may be determined when the received sensor data indicates a force greater than a maximum threshold. For example, a maximum threshold may be indicated by any force measurement greater than 100x, and a received/measured force at the sensor module 30 greater than 100x would result in the determination of a "failed connection." In one example, the maximum threshold may be correspond to the maximum combined weight of the child restraint system and the occupant (e.g., maximum load for current ISOFIX anchorages, including the weight of the child car seat plus the weight of the child, is limited to 33 kg). It is contemplated that the sensor module 30 can include a test apparatus for testing the status of the connection between the child restraint and the vehicle. The sensor module 30 can include an actuator for vibrating or applying a force to the attachment portion/clip 24 when coupled to the anchor/tether mounting member 10.

The status of the child restraint system 20 can also include a status of the occupant of the child restraint system 20 including the presence of the occupant and/or physiological data of the occupant. Physiological data can include the weight of the occupant, movement of the occupant, the respiratory rate of the occupant, the heart rate of the occupant, and audible effect of the occupant, and/or emotional state of the occupant. The audible effect of the occupant can include vocalization of the occupant and/or noise associated with the occupant's movement (e.g., kicking, noise associated with a toy, bottle/feeding, etc.). The emotional state can include the child crying and being agitated (excessive crying and/or movement). In an example system, certain ranges of sensor data can be associated with certain physiological states. The sensor data in a particular data range can also be filtered/analyzed to determine different states within that data range, or a narrower data range. For example, if the sensor data indicates that the child is not moving and possibly sleeping or relaxed, different filters can be applied to the sensor data determine the child's heart rate or respiratory rate. The memory 42 can also store instructions for causing the processor 40 to query and receive data from the vehicle. As outlined above, the processor 40 can query the vehicle control unit 50 to provide vehicle data including: operational status data, ignition status data, gear state data, rigid body vibration data, vehicle motion data, HVAC control data, temperature data, door state data, window state data, current estimated occupancy state data, whether the vehicle has experienced a catastrophic failure and/or sudden impact, and whether the occupant has indicated an emergency situation. It is also contemplated that the vehicle control unit 50 can periodically update the processor 40 with vehicle data.

In addition to controlling sensor module 30 operation, the processor 40 can also communicate counter-measure instructions to alter the state of the vehicle. The counter-measure instruction may include instructions to initiate an audible alarm, provide a visual display to a vehicle occupant, send an audio/digital message to a caregiver, and/or modify the vehicle environment.

It is contemplated that the processor 40 can provide counter-measure instructions to communicate, both internal and external to the vehicle, the status of the child and child seat. That is, the memory 42 can store instructions directing the processor 40 and/or the vehicle control unit to communicate the status data by onboard display and/or an external messaging system. Exemplary onboard displays include visual display on the vehicle's instrument panel, visual or audible notification via the vehicle infotainment system, on-wheel display screen, a heads-up display, or any other visual or audible communication method available on the vehicle. It is also contemplated that the onboard display can include haptic notification such as a haptic device included in the vehicle steering wheel. The processor 40 can also communicate status data external to the vehicle components via a telephonic or electronic messaging system including audio messaging and electronic mail/messaging.

In one example, the processor 40 can communicate data related to the status of the connection between the vehicle and the child restraint and/or the status of the occupant of the child restraint 20 to other vehicle occupants via onboard display. In another example, the vehicle instrument panel can display a message to the vehicle passengers indicating the attachment portion/clip 24 is locked or unlocked on the mounting member 10. In a further example, the processor 40 can communicate whether the connection is "failed" or "improper" or, in the case of successful connection, whether the connection is "poor" or "good." In yet another example, the processor 40 can communicate status data related to the child, such as a message indicating the child is having a heath event (e.g., respiratory failure, cardiac arrest).

Similar status data can be transmitted via telephonic and/or electronic messaging system to a caregiver. For example, a caregiver (remote from the vehicle), can receive an audio and/or digital message that regarding the status of the child restraint 20/occupant. In one example, a caregiver can receive an audio/digital message indicating that the child restraint 20 is occupied although the vehicle is not operational. In another example, a caregiver can receive an audio/digital message that the child restraint 20 and/or vehicle has experienced some failure or catastrophic event, e.g., the seat has become disconnected from the vehicle, or the vehicle has been in an accident.

In addition (or in the alternative) to providing counter-measure instructions to communicate status data via onboard display and/or electronic messaging, the processor 40 can also provide counter-measure instructions to modify vehicle operation. That is, the memory 42 can store instructions directing the processor 40 and/or vehicle control unit to modify a state and/or environment of the vehicle. The vehicle state/environment can be modified by changing the vehicle's operational status (i.e., turning the vehicle on/off), ignition status (e.g., turning the engine on/off), gear state (e.g., changing the gear the transmission is operating in), rigid body vibration capabilities, vehicle motion (e.g., engaging an emergency/parking brake, engaging an automatic breaking/collision avoidance system), HVAC control (e.g., turning on the vehicle air conditioning and/or heat), door state data (e.g., locking/unlocking the vehicle doors, opening/closing the vehicle's doors), window state data (e.g., opening/closing the vehicle's windows), and triggering an emergency warning/notification system (e.g., turning on hazard lights, requesting emergency assistance).

In one example, in response to sensor data indicating that the child restraint 20 is occupied and the temperature within the vehicle has risen to/above a certain threshold or at a certain rate, the processor 40 send instructions directing the vehicle to open the windows or turn on the air conditioning. In another example, in response to sensor data indicating that the child restraint 20 is occupied and the number of occupants has changed (e.g., there are no other passengers in the vehicle or there is no driver in the vehicle), the processor 40 can send instructions directing the vehicle to open a window or turn on the air conditioning. In another example, in response to sensor data indicating that the child restraint is occupied and the vehicle is turned off but moving, the processor 40 may send instructions to engage an emergency/parking break. In a further example, in response to sensor data indicating the child restraint 20 is occupied and a sudden deceleration the processor 40 can send instructions to trigger an emergency warning system and turn on hazard lights and request emergency assistance.

In use the disclosed sensor module 30 can be used to detect the status of a child in a child restraint system 20 in addition to the status of the child restraint system 20. The method 100 begins with collecting/measuring sensor data at a sensor module at step 102. The sensor module can include a sensor for measuring the force, pressure, acceleration, and/or detection of a latching clip and is measured at a coupling point between the child restraint system and an anchor mounting member fixedly coupled to a vehicle. The sensor data is indicative of the movement of an occupant of the child restraint system. The sensor data is also indicative of the presence or coupling of the attachment portion/clip with the anchor/tether mounting member (e.g., detect latching of the attachment portion/clip to the anchor/tether mounting member of the vehicle). The sensor data is received at a processor at step 104. Similarly, vehicle data force data corresponding the vehicle movement can be received at the processor. The processor can then isolate the force data corresponding to the child restraint system from the force data associated with vehicle movement.

Using the received (and isolated) sensor data, the status of the child restraint system can be determined at step 106. The status of the child restraint system can include the status of the connection between the vehicle and the child restraint system (e.g., whether the child restraint system is properly installed within the vehicle) and the status of the occupant of the child restraint system including the presence of the occupant and/or physiological data of the occupant.

Status data corresponding to the status of the child restraint system is generated at step 108. Based on the status data, a counter-measure is then provided at step 110. The counter-measure can include a communication, both internal and external to the vehicle, regarding the status of the child and child seat at step 110. For example, status data can be provided on an onboard display (including audio and haptic systems) to vehicle occupants. In another example, the status data can be communicated to a caregiver via an audio and/or digital message via a telephonic and/or electronic messaging network. The status data can also be communicated to a caretaker via a telephonic or electronic messaging system. The counter-measure can also include providing instructions to a vehicle control unit to modify the vehicles operation.

Accordingly, the disclosed sensor module can be used to detect the presence of a child left unattended in a restraint system. The sensor module can also be used to determine the physiological state of the child in addition to whether the child restraint has been properly secured to the vehicle. A caregiver can be notified of the child's presence, the child's state, and/or the connection of the restraint system by an onboard warning/display or electronic messaging. As a result, there is provided a detection system that can be incorporated into the child restraint and/or the vehicle mounting members that is integral to the operation restraint system operation.

While the foregoing description and drawings represent the preferred embodiment of the present invention, it will be understood that various additions, modifications, combinations and/or substitutions may be made therein without departing from the spirit and scope of the present invention as defined in the accompanying claims. In particular, it will be clear to those skilled in the art that the present invention may be embodied in other specific forms, structures, arrangements, proportions, and with other elements, materials, and components, without departing from the spirit or essential characteristics thereof. One skilled in the art will appreciate that the invention may be used with many modifications of structure, arrangement, proportions, materials, and components and otherwise, used in the practice of the invention, which are particularly adapted to specific environments and operative requirements without departing from the principles of the present invention. In addition, features described herein may be used singularly or in combination with other features. The presently disclosed embodiments are, therefore, to be considered in all respects as illustrative and not restrictive, the scope of the invention being indicated by the appended claims and not limited to the foregoing description.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention, as defined by the following claims.

The invention claimed is:

1. An apparatus for detecting a status of a child restraint system, the apparatus comprising:
   a sensor module including a sensor, the sensor measuring sensor data associated with a coupling between an attachment portion of a child restraint system and a vehicle, the child restraint system comprising a child seat separate from a vehicle seat and the attachment portion for coupling the child seat to the vehicle; and
   a processor in electrical communication with the sensor module and a memory, wherein the processor executes computer-readable instructions stored on the memory, the instructions causing the processor to:
   receive the sensor data,
   determine a status of the child restraint system based on the received sensor data, and
   communicate status data corresponding to the determined status of the child restraint system,
   wherein the sensor data is associated with a force, pressure, acceleration, and/or detection of a latching clip measured at the sensor,
   wherein the sensor data corresponds to movement of the child restraint system and includes spatially distributed reaction force data associated with the movement of the child restraint system.

2. The apparatus of claim 1, wherein the movement of the child restraint system corresponds to respiration and/or a heart rate of an occupant within the child restraint system.

3. The apparatus of claim 1, wherein the vehicle comprises an anchor mounting member, and the sensor module is coupled to one of the attachment portion of the child restraint system or the anchor mounting member of the vehicle,
   wherein the sensor module is located in a mechanical force path between the child restraint system and the anchor mounting member.

4. The apparatus of claim 3, wherein the sensor module is coupled to the attachment portion of the child restraint system, the attachment portion and configured to couple with the anchor mounting member of the vehicle, the anchor mounting member including a lower anchor point of a vehicle, a tether anchor point of a vehicle, and/or a seat belt of a vehicle.

5. The apparatus of claim 3 wherein a sleeve is coupled to the anchor mounting member of the vehicle, the sleeve comprising the sensor module.

6. The apparatus of claim 3, wherein the attachment portion of the child restraint system includes an anchor assembly for coupling a seat structure of the child restraint system to the anchor mounting member of the vehicle, the anchor assembly being coupled to the child restraint system at a coupling point, wherein the sensor module is located on the child restraint system adjacent the coupling point between the anchor assembly and the seat structure.

7. The apparatus of claim 3, wherein the sensor module includes at least one of:

a force/acceleration sensor that measures a tensional force and/or a motion between the child restraint system and the anchor mounting member;

a load cell that measures compressive force on the sensor module corresponding to tension between the child restraint system and the anchor mounting member; and a flexure sensor that measures the flexure of the sensor module resulting from tension between the child restraint system and the anchor mounting member.

8. The apparatus of claim 1, wherein the sensor includes an accelerometer, a single-axis inertial sensor, a multiple-axis inertial sensor, and/or an orthogonal tri-axial inertial sensor.

9. The apparatus of claim 1, wherein the sensor data comprises a linear force component and/or a rotational force component associated with a force and/or an acceleration of the child restraint system relative to the vehicle.

10. The apparatus of claim 1, wherein the status of the child restraint system comprises at least one of:

a status of a connection between the vehicle and the child restraint system, a status of an occupant of the child restraint system, the status of the occupant including the presence of the occupant of the child restraint system and/or physiological data of the occupant of the child restraint system.

11. The apparatus of claim 10, wherein the physiological data comprises a weight of the occupant, movement of the occupant, respiratory rate of the occupant, heart rate of the occupant, audible effect of the occupant, and/or emotional state of the occupant.

12. The apparatus of claim 10, wherein the status of the connection indicating an improper connection between the vehicle and the child restraint system is determined based on at least one of:

the sensor data associated with a force above a minimum threshold for an attachment point between the child restraint system and the vehicle and sensor data associated with a force below the minimum threshold for the attachment point between the child restraint system and the vehicle, and in response to not receiving any sensor data.

13. The apparatus of claim 1, wherein the instructions further cause the processor to isolate sensor data associated with movement of the occupant in the child restraint system from three-dimensional motion data associated with movement of the vehicle.

14. The apparatus of claim 1, wherein the instructions further cause the processor to receive vehicle data from the vehicle, wherein the analysis and/or receipt of the vehicle data triggers the processor to receive sensor data from the sensor module, the vehicle data including operational status data, ignition status data, gear state data, rigid body vibration data, vehicle motion data, HVAC control data, temperature data, door state data, window state data, and/or current estimated occupancy state data, wherein the status data includes counter-measure instruction to alter a state of the vehicle, the counter-measure instruction including instructions to initiate an audible alarm, provide a visual display to a vehicle occupant, and/or modify the vehicle environment, wherein the instructions further cause the processor to communicate an audio and/or digital message sent via a telephonic or electronic messaging network, the audio and/or digital message corresponding to the status data.

15. A method of detecting a status of a child restraint system, the method comprising:

collecting, at a sensor module, sensor data corresponding to a force, pressure, acceleration, and/or detection of a latching clip measured at a sensor provided at a coupling point between an attachment portion of the child restraint system and an anchor mounting member fixedly coupled to a vehicle, the child restraint system comprising a child seat separate from a vehicle and the attachment portion for coupling the child seat to the vehicle, the sensor data corresponding to movement of an occupant of the child restraint system and includes spatially distributed reaction force data associated with movement of the child restraint system;

receiving sensor data at a processor;

determining a status of the child restraint system;

generating status data corresponding to the status of the child restraint system; and communicating the status data to a control unit.

16. The method of claim 15, wherein status data comprises a counter-measure instruction based on the status of the child restraint system.

17. The method of claim 15, further comprising:

communicating the status data to a messaging system external from the vehicle, communicating an audio and/or digital message via a telephonic and/or electronic messaging network, the audio and/or digital message corresponding to the status data.

* * * * *